United States Patent
Chen et al.

(10) Patent No.: US 11,169,865 B2
(45) Date of Patent: Nov. 9, 2021

(54) ANOMALOUS ACCOUNT DETECTION FROM TRANSACTION DATA

(71) Applicant: NEC Laboratories America, Inc., Princeton, NJ (US)

(72) Inventors: Haifeng Chen, West Windsor, NJ (US); Bo Zong, West Windsor, NJ (US); Wei Cheng, Prnceton Junction, NJ (US); LuAn Tang, Pennington, NJ (US); Jingchao Ni, Princeton, NJ (US)

(73) Assignee: NEC Corporation

( * ) Notice: Subject to any disclaimer, the term of this patent is extended or adjusted under 35 U.S.C. 154(b) by 138 days.

(21) Appl. No.: 16/562,755

(22) Filed: Sep. 6, 2019

(65) Prior Publication Data

US 2020/0089556 A1    Mar. 19, 2020

Related U.S. Application Data

(60) Provisional application No. 62/732,633, filed on Sep. 18, 2018.

(51) Int. Cl.
| | |
|---|---|
| *G06F 11/07* | (2006.01) |
| *G06N 3/08* | (2006.01) |
| *G06N 20/10* | (2019.01) |
| *G06K 9/62* | (2006.01) |

(52) U.S. Cl.
CPC .......... *G06F 11/0709* (2013.01); *G06K 9/623* (2013.01); *G06N 3/08* (2013.01); *G06N 20/10* (2019.01)

(58) Field of Classification Search
CPC ...... H04L 41/00; G06F 11/0709; G06N 20/10
See application file for complete search history.

(56) References Cited

U.S. PATENT DOCUMENTS

| | | | |
|---|---|---|---|
| 2015/0356462 A1 | 12/2015 | Fawaz et al. | |
| 2016/0226872 A1 | 8/2016 | Oberheide et al. | |
| 2016/0261465 A1* | 9/2016 | Gupta | H04W 12/121 |
| 2018/0234519 A1* | 8/2018 | Boyapalle | H04L 41/0806 |
| 2018/0253569 A1* | 9/2018 | Swierk | G06F 21/86 |
| 2019/0149565 A1* | 5/2019 | Hagi | G06N 20/00 |
| | | | 726/23 |

OTHER PUBLICATIONS

Ambika Kaul et al. Autolearn-Automated Feature Generation and Selection. In 2017 IEEE International Conference on Data Mining (ICDM), New Orleans, LA, USA: IEEE, Dec. 18, 2017; E-ISSN: 2374-8486 (See p. 218).

(Continued)

*Primary Examiner* — Minh Chau Nguyen
(74) *Attorney, Agent, or Firm* — Joseph Kolodka (57) ABSTRACT

Systems and methods for implementing heterogeneous feature integration for device behavior analysis (HFIDBA) are provided. The method includes representing each of multiple devices as a sequence of vectors for communications and as a separate vector for a device profile. The method also includes extracting static features, temporal features, and deep embedded features from the sequence of vectors to represent behavior of each device. The method further includes determining, by a processor device, a status of a device based on vector representations of each of the multiple devices.

20 Claims, 8 Drawing Sheets

(56) References Cited

OTHER PUBLICATIONS

Chitra et al., "Data Mining Techniques and its Applications in Banking Sector", International Journal of Emerging Technology and Advanced Engineering. 2008 Certified Journal. vol. 3, Issue 8. Aug. 2013. pp. 219-226.
Jayasree et al., "Money laundering regulatory risk evaluation using Bitmap Index-based Decision Tree", Journal of the Association of Arab Universities for Basic and Applied Sciences. Jun. 1, 2017. vol. 23, Issue 1. pp. 96-102.
Lopez-Rojas et al., "Multi Agent Based Simulation (MABS) of Financial Transactions for Anti Money Laundering (AML)", Nordic Conference on Secure IT Systems Oct. 2012. Blekinge Institute of Technology. pp. 1-9.
Zhang et al., "HiDDen: Hierarchical Dense Subgraph Detection with Application to Financial Fraud Detection", Proceedings of the 2017 SIAM International Conference on Data Mining. Society for Industrial and Applied Mathematics. Jun. 30, 2017. pp. 570-578.

\* cited by examiner

ANOMALOUS ACCOUNT DETECTION FROM TRANSACTION DATA

RELATED APPLICATION INFORMATION

This application claims priority to U.S. Provisional Patent Application No. 62/732,633, filed on Sep. 18, 2018, incorporated herein by reference herein its entirety.

BACKGROUND

Technical Field

The present invention relates to deep learning and more particularly to applying deep learning for predicting device failure in computing systems.

Description of the Related Art

Deep learning is a machine learning method based on artificial neural networks. Deep learning architectures can be applied to fields including computer vision, speech recognition, natural language processing, audio recognition, social network filtering, machine translation, bioinformatics, drug design, medical image analysis, material inspection and board game programs, etc. Deep learning can be supervised, semi-supervised or unsupervised.

SUMMARY

According to an aspect of the present invention, a method is provided for implementing heterogeneous feature integration for device behavior analysis (HFIDBA) are provided. The method includes representing each of multiple devices as a sequence of vectors for communications and as a separate vector for a device profile. The method also includes extracting static features, temporal features, and deep embedded features from the sequence of vectors to represent behavior of each device. The method further includes determining, by a processor device, a status of a device based on vector representations of each of the multiple devices.

According to another aspect of the present invention, a system is provided for implementing heterogeneous feature integration for device behavior analysis (HFIDBA). The system includes a processor device operatively coupled to a memory device. The processor device represents each of multiple devices as a sequence of vectors for communications and as a separate vector for a device profile. The processor device also extracts static features, temporal features, and deep embedded features from the sequence of vectors to represent behavior of each device. The processor device also determines a status of a device based on vector representations of each of the plurality of devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for heterogeneous feature integration for device behavior analysis (HFIDBA) to perform server failure prediction in a distributed computer system. In this context, devices are servers. Agents installed in servers collect their communication and profile data and store the communication and profile data in a database. The systems implementing HFIDBA access the communication and profile data through the database, build a prediction model based on history data, make predictions for future server failure events, and send the prediction results to end users such as system administrators.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
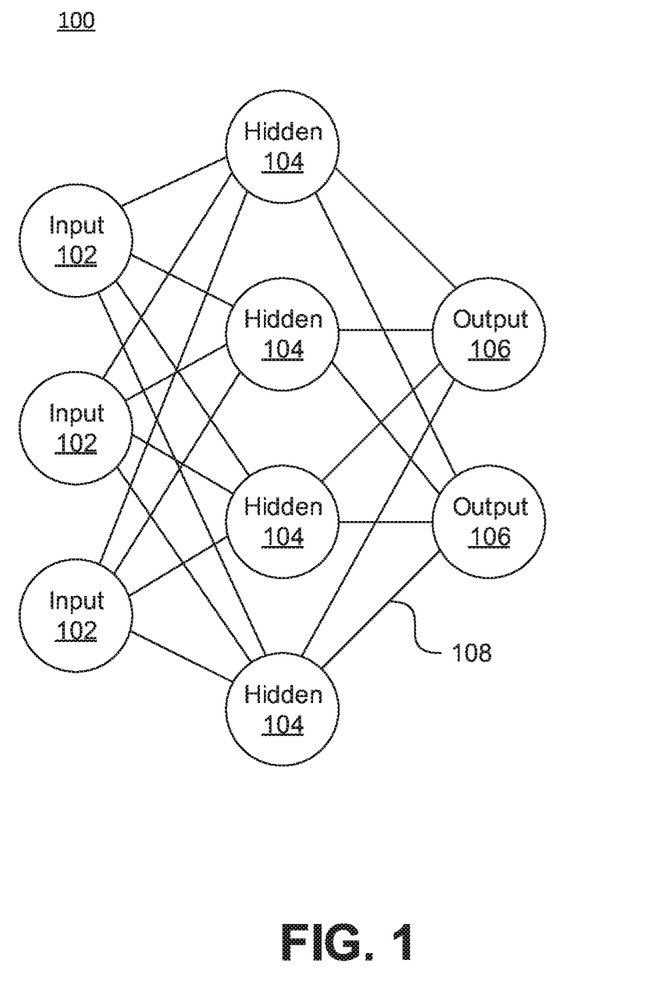
FIG. 1 is a generalized diagram of a neural network, in accordance with an embodiment of the present invention.

Referring now to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
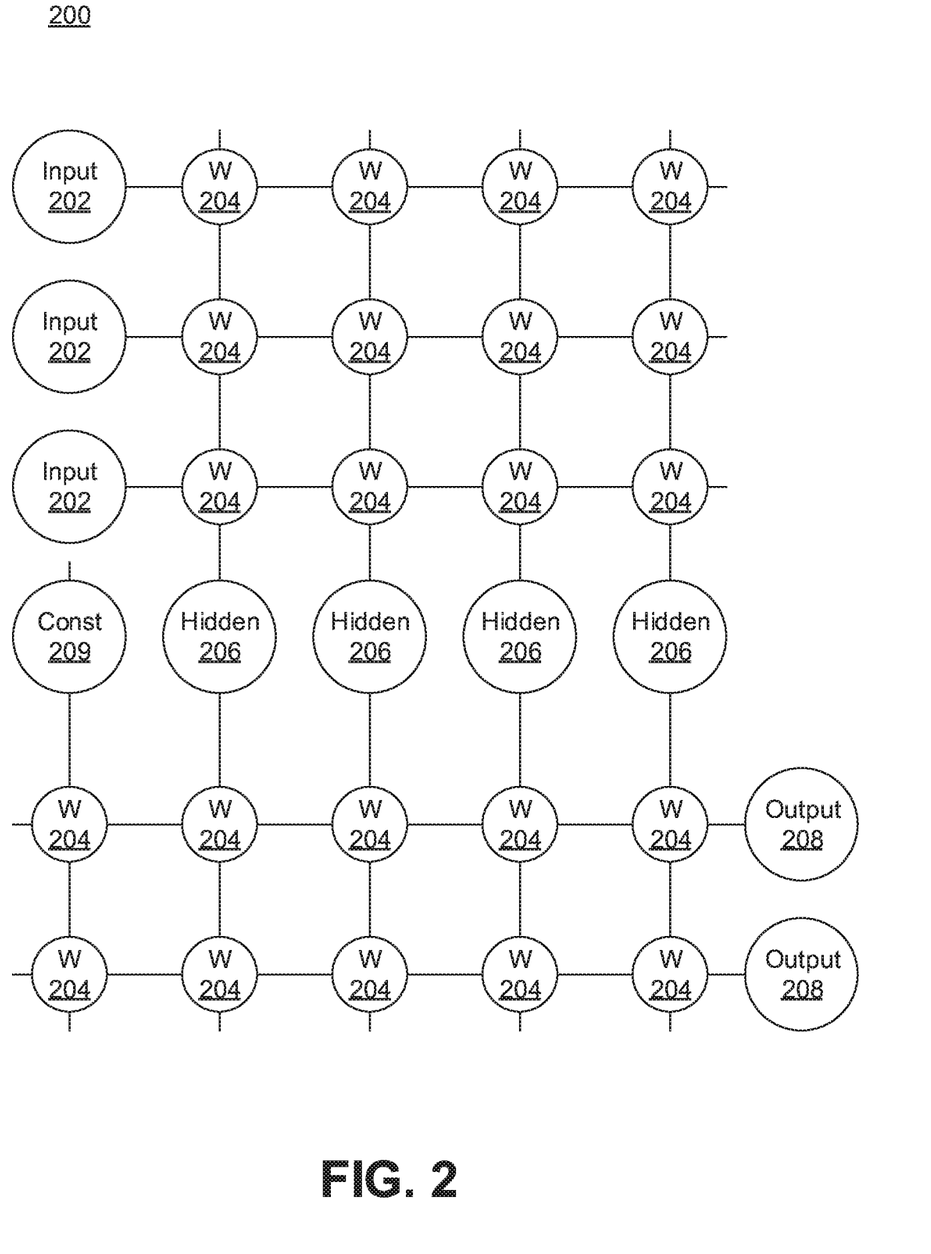
FIG. 2 is a diagram of an artificial neural network (ANN) architecture, in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural network (CNN) is a subclass of ANNs which has at least one convolution layer. A CNN consists of an input and an output layer, as well as multiple hidden layers. The hidden layers of a CNN consist of convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to require minimal preprocessing. CNNs are also known as shift invariant or space invariant artificial neural networks (SIANN), based on their shared-weights architecture and translation invariance characteristics. CNNs can be used for applications in image and video recognition, recommender systems, image classification, medical image analysis, and natural language processing.

Figure 3:
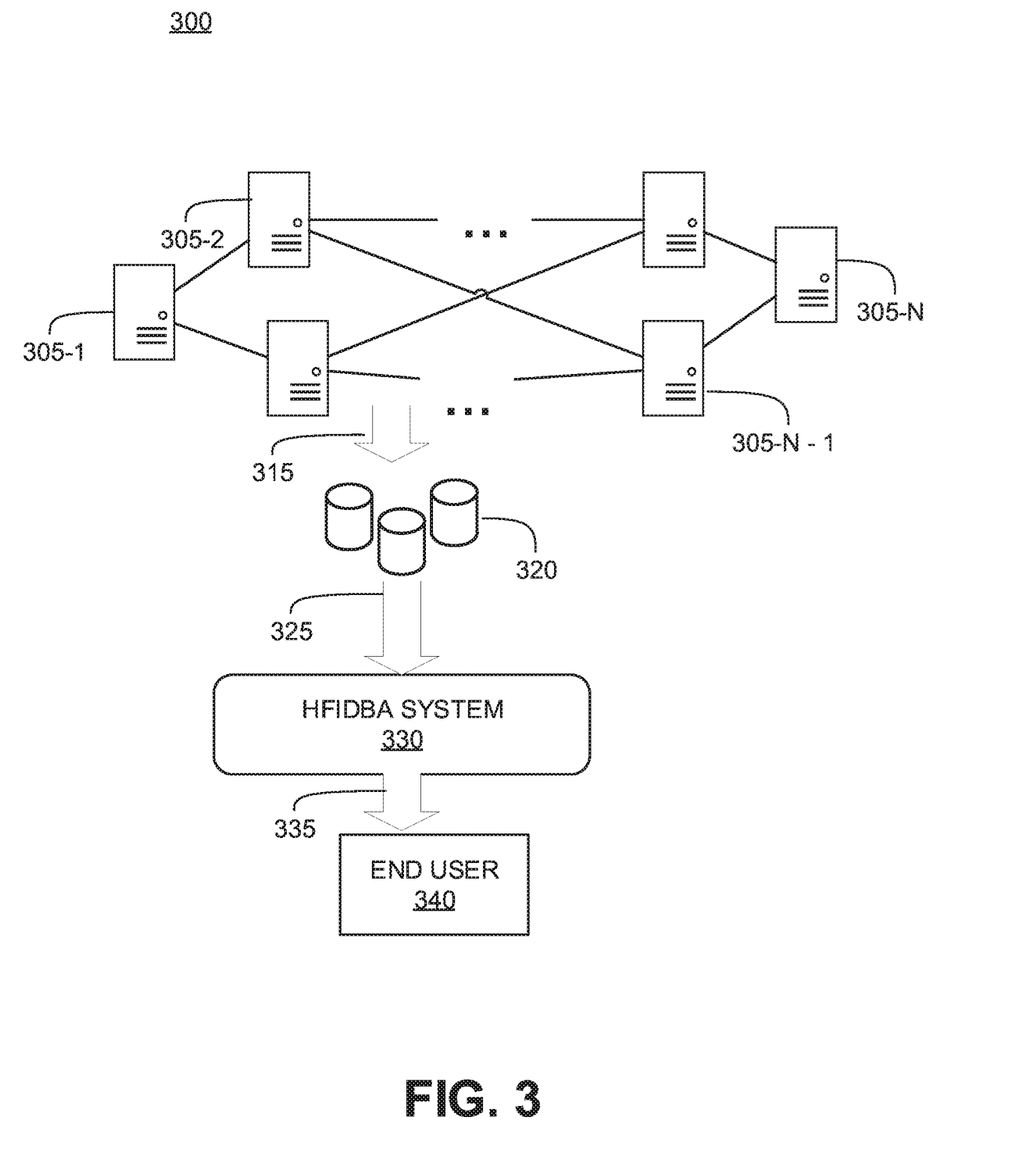
FIG. 3 is a block diagram illustrating an environment for implementing heterogeneous feature integration for device behavior analysis (HFIDBA), in accordance with the present invention.

Referring now to FIG. 3, a block diagram illustrating a system 300 for implementing a process of heterogeneous feature integration for device behavior analysis (HFIDBA) in a distributed computer system, in accordance with example embodiments.

HFIDBA system 330 implements modules, components, devices and processes that perform server failure prediction in a distributed computer system that includes devices that perform as servers 305 (shown as servers 305-1, 305-2, ..., 305-N−1 to 305-N). Agents (not separately shown in FIG. 3) installed in the servers 305 collect the communication and profile data of the servers 305 and store 315 the communication and profile data in a database 320. HFIDBA system 330 accesses the communication and profile data through the database 320, builds a prediction model based on historical data, makes prediction for future server failure events, and sends the prediction results to end users 340 such as system administrators, as described herein below with respect to FIGS. 4 to 8.

Figure 4:
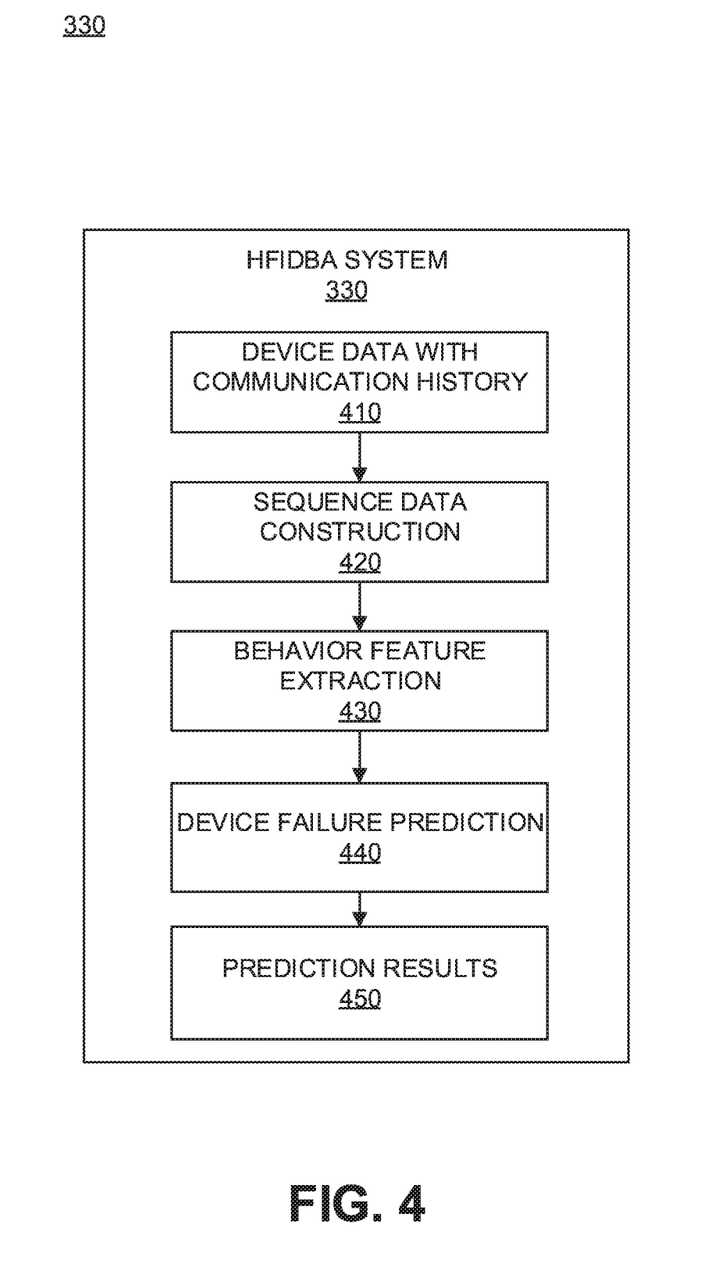
FIG. 4 is a block diagram illustrating a system that implements HFIDBA, in accordance with the present invention.

Referring now to FIG. 4, HFIDBA system 330 can include a device data with communication history (that can be implemented as a component, module or device, although hereinafter referred to as a "component" for clarity) 410, a sequence data construction (component, module or device) 420, a behavior feature extraction (component, module or device) 430, a device failure prediction (component, module or device) 440, and a prediction results (component, module or device) 450.

Device data with communication history component 410 includes (or provides access to) device profile data and associated communication history. For example, device data with communication history component 410 can provide interfaces with database 320.

Communication data contains communication history of individual devices 305. In general, each communication record includes information on when this communication happened, how much data was involved, and many other descriptions of the data and communication such as communication types, purpose of this communication, etc. Each of the communications can include a communication record with information on a communication date (and time), a communication amount, and a communication type.

Device profile data contains information related to devices, such as device type, manufacturer, etc.

Sequence data construction component 420 determines sequences (for example, data structures) used to represent each device 305. Sequence data construction component 420 can build a sequence for each device 305 that encodes both communication and device profile data. The sequence can be stored (or manipulated/sent/received/etc.) as a data structure used to represent data, such as the encoded communication and device profile data, as described herein in detail below with respect to FIG. 5.

Behavior feature extraction component 430 extracts behavior features from the sequences built by sequence data construction component 420 and represents each company by a feature vector, as described herein in detail below with respect to FIG. 6.

Device failure prediction 440 prepares data samples, and discover anomalies by implementing anomalous device detection techniques for vector data (such as, for example, a customized anomaly detection technique for patterns associated with anomalous devices, density-based spatial clustering of applications with noise (DBSCAN), isolation forest, one-class support vector machine, etc.), as described herein in detail below with respect to FIG. 7. The device failure can include a risk of a device ceasing to be operational.

Alternatively, device failure prediction 440 can be implemented to discover cybersecurity risks, etc. In the scenario of cybersecurity, the concept of device behavior analysis can also be applied. For example, in the case of network intrusion detection, each device will receive different kinds of packets over time and form a sequence of packet events. By applying device behavior analysis, HFIDBA system 330 can discover abnormal behaviors in terms of packet events, which could be malicious intrusion that is worth network administrator's attention. For example, when one normal device usually receives a pair of "start" and "end" packets with average inter-arrival time 100 ms, one device under attack could receive "start" packets without "end" packets with average inter-arrival time 10 ms. HFIDBA system 330 can detect these differences in behavior and provide notification to a system administrator (and/or execute pre-programmed actions, such as limiting access by the suspicious device).

Prediction results 450 reports predictions to end users 340 and implements predetermined responses to detected activity based on predetermined responses provided by the HFIDBA system 330. In an example embodiment, prediction results 450 determines and reports prediction results.

HFIDBA system 330 implements detection of anomalous devices in a computing architecture in a manner that circumvents scarce training data for detecting these anomalous devices. The example embodiments can implement unsupervised processes for detection of anomalous devices without a training phase or prior knowledge of the patterns of anomalous activity. Additionally, HFIDBA system 330 can incorporate knowledge on predetermined types of activities that tend to be associated with (or generated by) anomalous devices, for example determined through manual verification of domain experts. HFIDBA system 330 allows detection in an unsupervised setting (as opposed to a supervised setting that needs expert guidance and/or knowledge of types of activities associated with questionable devices) with minimal (for example, little or no, etc.) prior knowledge about the testing data.

HFIDBA system 330 performs feature engineering for effective detection in a manner that overcomes limitations of dimensionality. HFIDBA system 330 can reduce (for example, alleviate or nullify) sensitivity to high dimensionality of data, including data with many features that are irrelevant or noisy. HFIDBA system 330 can be implemented to detect anomalous devices with unsupervised processes that have weaker (or limited, etc.) abilities to select features (in contrast to supervised methods/processes).

HFIDBA system 330 can recover hidden behavior features. HFIDBA system 330 can analyze raw communication data to obtain useful features to characterize anomalous devices and differentiate them from normal devices. HFIDBA system 330 can identify useful behavior features that are local and buried (for example, obscured, obfuscated, etc.) in the whole history of communications.

HFIDBA system 330 implements a general framework that takes devices data along with their communication history as input, performs feature extraction from multiple perspectives (for example, using one or both of expert-guided and deep learning methods), conducts anomaly detection based on the extracted features, and reports detection results.

HFIDBA system 330 can implement HFIDBA in a single phase. In this phase, the input includes device profile and communication history. HFIDBA system 330 builds a communication sequence for each device, and extracts behavior features from the sequence by (one or) both (of) feature engineering and deep learning methods. In this way, HFIDBA system 330 represents each device as a vector, and utilizes (for example, off-the-shelf, proprietary or custom designed) anomaly detection techniques to detect anomalous devices.

Figure 5:
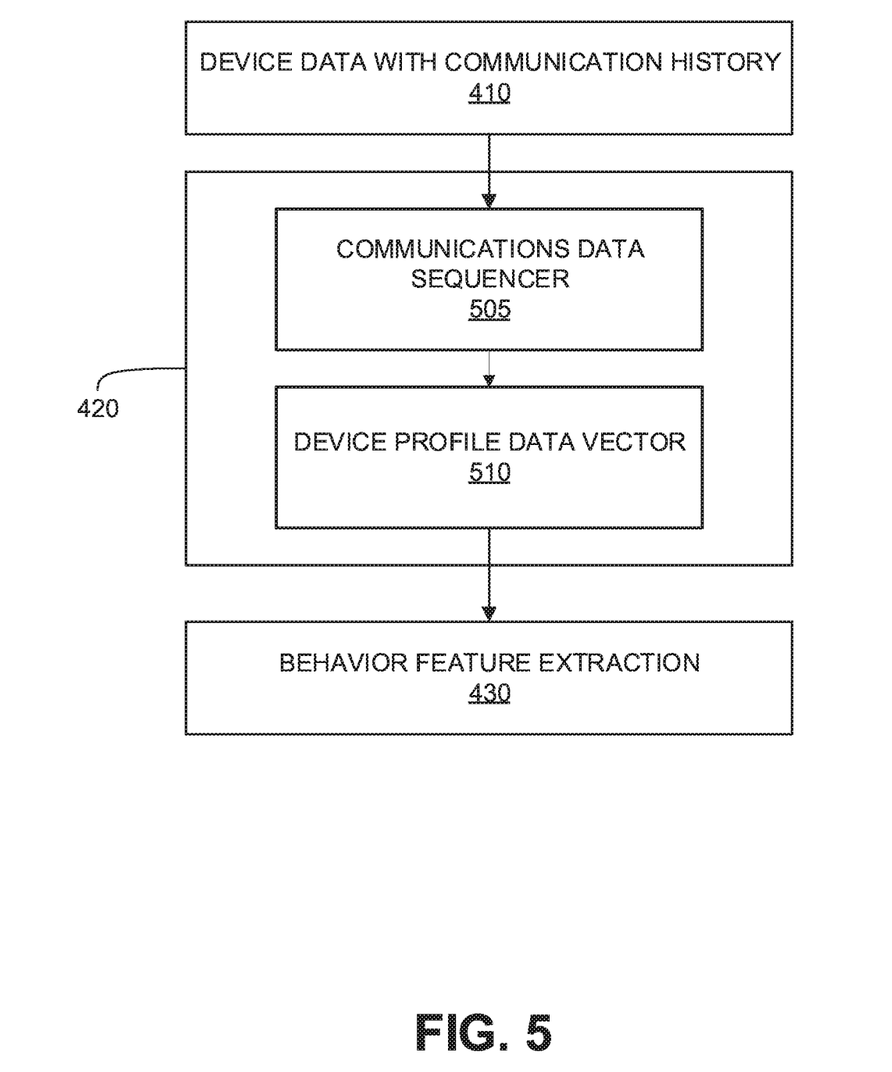
FIG. 5 is a block diagram illustrating a process of sequence data construction, in accordance with an embodiment of the present invention.

FIG. 5 is a block diagram illustrating a process of sequence data construction, in accordance with example embodiments.

As shown in FIG. 5, sequence data construction component 420 includes a communications data sequencer 505 and a device profile data vector 410. Sequence data construction component 420 receives input device profile and communication history, for example, from database 320, etc. Sequence data construction component 420 represents each device as a sequence of vectors for communications and a separate vector for device profile.

Communications data sequencer 505 determines sequences from the communication data. Communications data sequencer 505 can also include requests for communications, and/or denied (or cancelled) communications in the communication data. Communications data sequencer 505 represents each device as a sequence of communications $<e_1, e_2, \ldots, e_n>$, where $e_i$ is an event, recording information of a communication. In example embodiments, communications data sequencer 505 uses a multi-dimensional vector for each event to encode both communication and profile attributes. Note that communications data sequencer 505 can determine the order among events (or communications) in each sequence consistent with the temporal order of communication.

Device profile data vector 410, in example embodiments, can determine (or access, identify, etc.) device profile data that is time invariant or static. Therefore, device profile data vector 410 uses a separate multi-dimensional vector to encode device profile data. Device profile data vector 410 can identify links between related devices.

After sequence data construction component 420 is implemented, HFIDBA system 330 determines a sequence (for communications) and a vector (for device profile) for each device.

Figure 6:
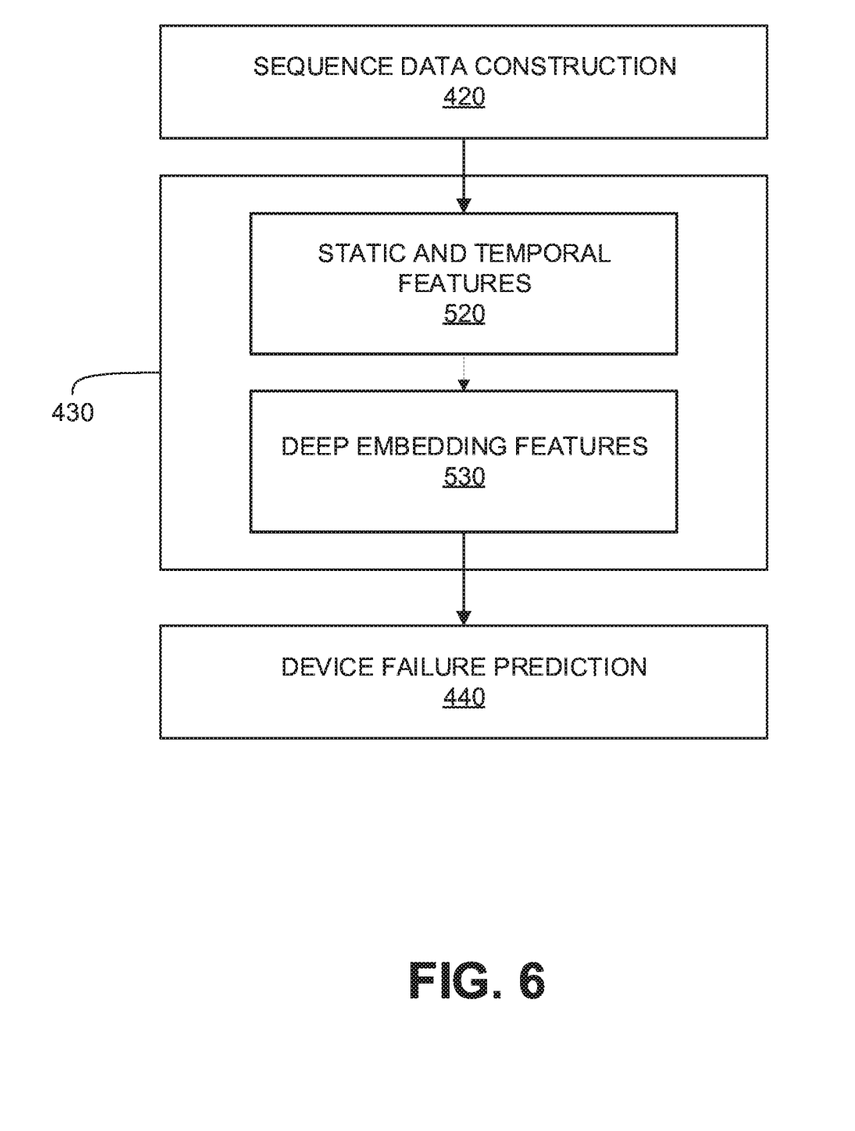
FIG. 6 is a block diagram illustrating a process of behavior feature extraction, in accordance with an embodiment of the present invention.

FIG. 6 is a block diagram illustrating a process of behavior feature extraction as implemented by behavior feature extraction component 430, in accordance with example embodiments.

As shown in FIG. 5, behavior feature extraction component 430 implements behavior feature extraction, particularly, using static and temporal features extraction (component, device or module) 520 and deep embedding features extraction (component, device or module) 530. Behavior feature extraction component 430 extracts static, temporal, and deep embedding features to represent a behavior of each device from different angles (perspectives, views, etc.).

Static and temporal features extraction 520 derives static features and temporal features from relevant patterns (for example, patterns discovered by experts, provided by a user of HFIDBA system 330, etc.).

Static and temporal features extraction 520 assumes (or determines) that static features are temporally independent. The temporal/sequence order of static features are determined to be irrelevant to device failure prediction as communications are temporally independent. Under this assumption (or condition), static and temporal features extraction 520 determines a sequence of vectors to be equivalent to a collection of vectors. From this angle, static and temporal features extraction 520 derives a (for example, rich, varied, large, etc.) class of features to distinguish the statistical difference, such as mean, median, and variance in each individual dimension(s).

Static and temporal features extraction 520 assumes (or determines) that temporal features include different existing temporal patterns between normal and anomalous devices. To extract these temporal features, static and temporal features extraction 520 utilizes point process (e.g., Hawke process, Poisson process, manual feature engineering, etc.) to summarize each sequence into learned model parameters. In this way, static and temporal features extraction 520 compresses each sequence into a vector, each of which indicates a temporal correlation(s) suggested by the underlying point process.

Deep embedding features extraction 530 derives (for example, deep embedding) features from deep embedding processes. Deep embedding features are intermediate vector representations from a predefined deep learning technique. These deep embedding processes do not need (or include, etc.) domain knowledge or predefined patterns from experts. In both supervised and unsupervised situations, deep embedding processes are applicable.

In a supervised situation (or setting), deep embedding features extraction 530 assumes that there are labels (e.g., normal and anomalous) for a subset(s) of devices. Deep embedding features extraction 530 can utilize variants of recurrent neural network (e.g., gated recurrent unit (GRU) and long short-term memory (LSTM), etc.) to build an architecture that performs label prediction. In this architecture, the vector representations serving as input to the classification layer are embedding of devices. Embedding of devices refers to converting data to a feature representation where certain properties associated with the devices can be represented by (for example, notions of, relative, etc.) distance. Classification is the process of predicting the class of given data points. A classification layer computes the cross-entropy loss for multi-class classification problems with mutually exclusive classes. A deep classifier maps input data to a specific category in a deep learning network. Therefore, once a deep classifier for the sequence is trained, the deep classifier can serve as an embedding system by removing the last classification layer. When the learned deep classifier is treated as an embedding system, deep embedding features extraction 530 feeds a sequence data of a device to the deep classifier, and extracts the intermediate vector representations as the output, which can be used as embedding features.

In an unsupervised situation (or setting), deep embedding features extraction 530 can utilize an autoencoder for sequences to project the sequence into a vector space. An autoencoder is a type of artificial neural network that can learn efficient data codings in an unsupervised manner.

In sum, according to example embodiments, behavior feature extraction component 430 implements static and temporal features extraction 520 and deep embedding features extraction 530 to go through each sequence and generate static, temporal, and deep embedding features for the sequence. For each device, behavior feature extraction component 430 concatenates static, temporal, and deep embedding features of the device into a long feature vector, which is used in device failure prediction 440 for detecting anomalous devices, as described below with respect to FIG. 6.

Figure 7:
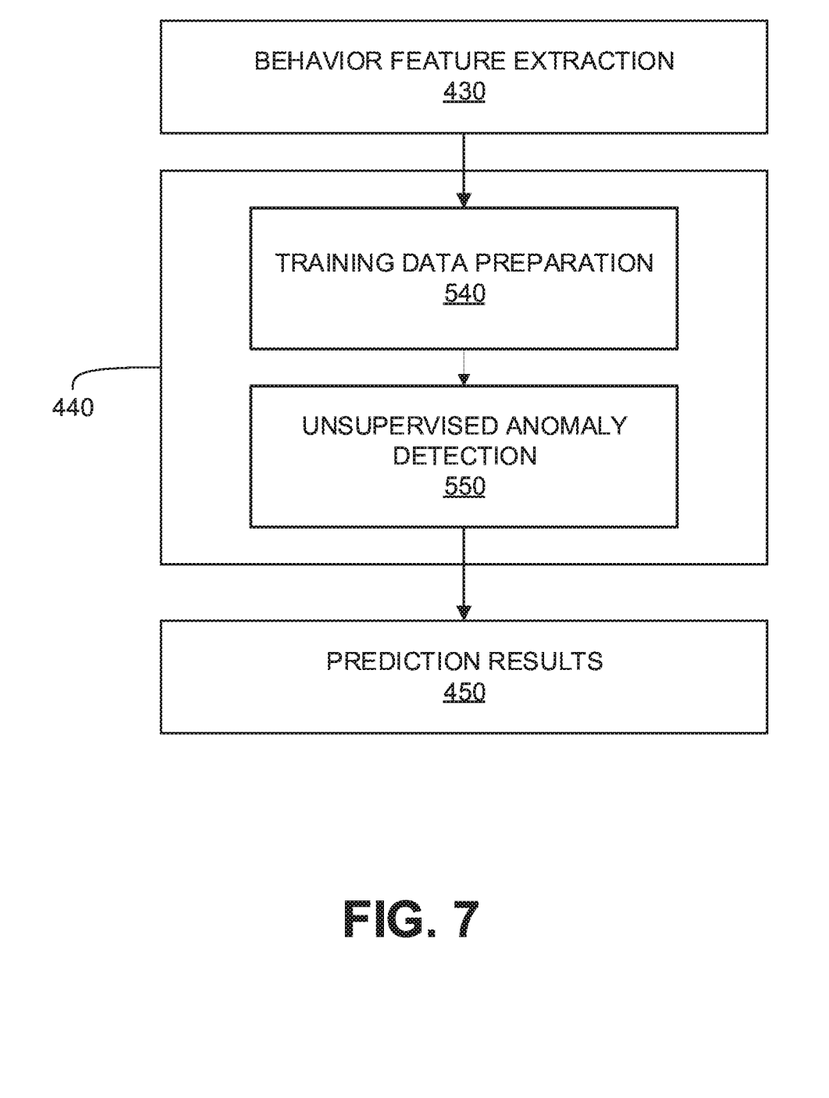
FIG. 7 is a block diagram illustrating a process of anomalous device detection, in accordance with an embodiment of the present invention.

FIG. 7 is a block diagram illustrating model training as implemented by device failure prediction 440, in accordance with example embodiments.

As shown in FIG. 7 device failure prediction 440 includes training data preparation (component, device or module) 540 and unsupervised anomaly detection (component, device or module) 550. Device failure prediction 440 can automate the decision process from vector representations of devices (provided by behavior feature extraction component 430, as described above with respect to FIG. 6) to determination of the status of the devices as normal or anomalous.

Training data preparation 540 performs training data preparation. For example, training data preparation 540 can prepare a set of vectors, each of which is the vector representation of a corresponding device. The vector representation can include a long feature vector that concatenates static, temporal, and deep embedding features.

Unsupervised anomaly detection 550 implements unsupervised anomaly detection. Given input vectors, unsupervised anomaly detection. 550 can utilize (for example, off-the-shelf, customized, proprietary, etc.) anomaly detection techniques for vectors (e.g., DBSCAN, isolation forest, or one-class support vector machine) to discover anomalies in a collection of data. The anomalies can be treated as devices that are likely to fail within a predetermined time and reported to end users. The anomalies can also be used to implement further actions by the system (for example, load balancing, re-routing, rescheduled maintenance, etc.).

Figure 8:
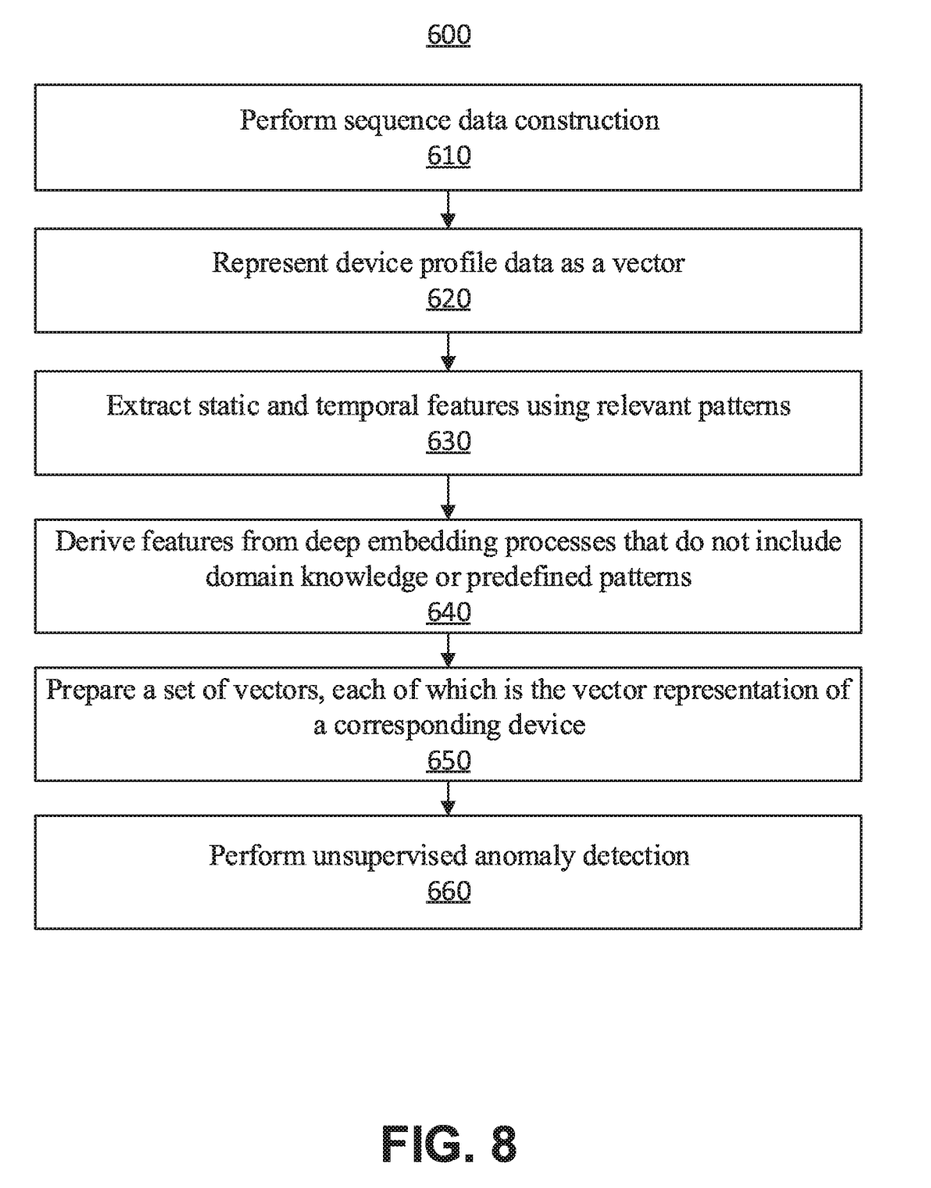
FIG. 8 is a flow diagram illustrating a method of implementing HFIDBA, in accordance with the present invention.

FIG. 8 is a flow diagram illustrating a method 600 for implementing GLCPP for company performance prediction, in accordance with the present invention.

At block 610, system 300 performs sequence data construction. For example, system 300 can represent communication data as a sequence based on a time of each communication. Each device can be represented as a sequence of communications $<e_1, e_2, \ldots, e_n>$, where $e_i$ is an event, recording information of a communication.

At block 620, system 300 can represent device profile data as a vector. System 300 can encode device profile data as a separate multi-dimensional vector.

At block 630, system 300 extracts static and temporal features using relevant patterns, in a similar manner as described with respect to FIG. 6, herein above. System 300 can extract a static feature in which communications are temporally independent for device failure prediction. System 300 can identify different temporal patterns between normal and anomalous devices. For example, temporal patterns can include a sequence of different types of communications, etc. In one example, a healthy device can have regular communication patterns, such as open→read-→write→close, but a to-be-failed device could make generate abnormal event sequence, such as open→open→open.

At block 640, system 300 derives features from deep embedding processes that do not include domain knowledge or predefined patterns (for example, from experts). System 300 derives features from deep embedding processes in both supervised and unsupervised situations.

At block 650, system 300 prepares a set of vectors, each of which is the vector representation of a corresponding device as described herein above with respect to FIG. 6.

At block 660, system 300 performs unsupervised anomaly detection. Given input vectors, system 300 can utilize (for example, off-the-shelf, etc.) anomaly detection techniques for vectors (e.g., DBSCAN, isolation forest, or one-class support vector machine) to discover anomalies in a collection of data. system 300 treats the anomalies as devices that are likely to fail within a predetermined time and reports the devices to end users. In some instances, devices can be grouped based on different projected timelines of failure, such as within a week, a month, a quarter, a year, etc.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing heterogeneous feature integration for device behavior analysis (HFIDBA) to detect suspicious account transactions, comprising:

representing transaction history data and account data for each of a plurality of accounts associated with one or more devices as a transaction sequence of multidimensional vectors for communications and as a separate vector for an account profile for each of the plurality of accounts, respectively, wherein each of the accounts is represented as a sequence of transactions $<e_1, e_2, \ldots, e_n>$, where $e_i$ represents an event recording information of a transaction;

extracting at least one static feature, at least one temporal feature, and at least one deep embedded feature from the sequence of vectors to represent behavior of account transactions associated with each of the one or more devices; and determining, by a processor device, a status of one or more of the account transactions associated with the each of the one or more devices based on the vector representations associated with each of the one or more devices.

2. The method as recited in claim 1, wherein the representing transaction history data and account data for each of the plurality of accounts associated with the one or more devices as the transaction sequence of multidimensional vectors for communications and the separate vector for a device profile further comprises:

deriving, for each of the one or more devices, at least one deep embedded feature based on deep embedding processes; and determining, for each of the one or more devices, a set of vectors based on the at least one static feature, the at least one temporal feature, and the at least one deep embedded feature.

3. The method as recited in claim 2, wherein the deep embedding processes do not include domain knowledge or predefined patterns.

4. The method as recited in claim 1, wherein determining the status of the device further comprises:

determining whether a device is likely to fail within a predetermined time based on detecting anomalies in the device.

5. The method as recited in claim 1, wherein the representing transaction history data and account data for each of the plurality of accounts associated with the one or more devices as the transaction sequence of multidimensional vectors for communications and the separate vector for an account profile further comprises:

performing, for each of a plurality of devices, sequence data construction to represent each device as a sequence vector that encodes a sequence of communications; and representing device profile data, for each of the plurality of devices, as a device profile vector.

6. The method as recited in claim 1, wherein the extracting the at least one static feature, the at least one temporal feature, and the at least one deep embedded feature from the sequence of vectors further comprises:

extracting, for each of the plurality of devices, the at least one static feature and the at least one temporal feature using at least one predetermined pattern.

7. The method as recited in claim 1, wherein the determining the status of the one or more of the account transactions associated with the each of the one or more devices based on the vector representations of each of the plurality of devices further comprises:

performing unsupervised anomaly detection based on the vector representations.

8. The method as recited in claim 1 wherein the performing unsupervised anomaly detection further comprises:

using at least one of density-based spatial clustering of applications with noise (DBSCAN), isolation forest, and one-class support vector machine to detect anomalies.

9. The method as recited in claim 1, wherein each of the communications includes a communication record with information on a communication date, a communication amount, and a communication type.

10. The method as recited in claim 1, wherein the at least one temporal feature indicates a temporal correlation suggested by an underlying point process.

11. The method as recited in claim 1, wherein the at least one static feature includes at least one of a mean, median, and variance.

12. A computer system for implementing heterogeneous feature integration for device behavior analysis (HFIDBA) to detect suspicious account transactions, comprising:

a processor device operatively coupled to a memory device, the processor device being configured to:

represent transaction history data and account data for each of a plurality of accounts associated with one or more devices as a transaction sequence of multidimensional vectors for communications and as a separate vector for an account profile for each of the plurality of accounts, respectively, wherein each of the accounts is represented as a sequence of transactions $<e_1, e_2, \ldots, e_n>$, where $e_i$ represents an event recording information of a transaction;

extract at least one static feature, at least one temporal feature, and at least one deep embedded feature from the sequence of vectors to represent behavior of account transactions associated with each of the one or more devices; and determine a status of one or more of the account transactions associated with the each of the one or more devices based on the vector representations associated with each of the one or more devices.

13. The system as recited in claim 12, wherein, when determining the status of the device, the processor device is further configured to:

determine whether a device is likely to fail within a predetermined time based on detecting anomalies in the device.

14. The system as recited in claim 12, wherein, when representing the transaction history data and account data for each of the plurality of accounts associated with the one or more devices as the transaction sequence of multidimensional vectors for communications and the separate vector for an account profile, the processor device is further configured to:

perform, for each of a plurality of devices, sequence data construction to represent each device as a sequence vector that encodes a sequence of communications; and represent device profile data, for each of the plurality of devices, as a device profile vector.

15. The system as recited in claim 12, wherein, when extracting the at least one static feature, the at least one temporal feature, and the at least one deep embedded feature from the sequence of vectors, the processor device is further configured to:

extract, for each of the plurality of devices, the at least one static feature and the at least one temporal feature using at least one predetermined pattern.

16. The system as recited in claim 12, wherein, when representing transaction history data and account data for each of the plurality of accounts associated with the one or more devices as the transaction sequence of multidimensional vectors for communications and the separate vector for a device profile, the processor device is further configured to:

derive, for each of the one or more devices, at least one deep embedded feature based on deep embedding processes; and determine, for each of the one or more devices, a set of vectors based on the at least one static feature, the at least one temporal feature, and the at least one deep embedded feature.

17. The system as recited in claim 12, wherein the deep embedding processes do not include domain knowledge or predefined patterns.

18. The system as recited in claim 12, wherein, when determining the status of one or more of the account transactions associated with the each of one or more devices based on the vector representations of each of the plurality of devices, the processor device is further configured to:

perform unsupervised anomaly detection based on the vector representations.

19. The system as recited in claim 12, wherein, when performing unsupervised anomaly detection, the processor device is further configured to:

using at least one of density-based spatial clustering of applications with noise (DBSCAN), isolation forest, and one-class support vector machine to detect anomalies.

20. A computer program product for implementing heterogeneous feature integration for device behavior analysis (HFIDBA) to detect suspicious account transactions, the computer program product comprising a non-transitory computer readable storage medium having program instructions embodied therewith, the program instructions executable by a computing device to cause the computing device to perform the method comprising:

representing transaction history data and account data for each of a plurality of accounts associated with one or more devices as a transaction sequence of multidimensional vectors for communications and as a separate vector for an account profile for each of the plurality of accounts, respectively, wherein each of the accounts is represented as a sequence of transactions $<e_1, e_2, \ldots, e_n>$, where et represents an event recording information of a transaction;

extracting at least one static feature, at least one temporal feature, and at least one deep embedded feature from the sequence of vectors to represent behavior of account transactions associated with each of one or more devices; and determining, by a processor device, a status of one or more of the account transactions associated with the each of one or more devices based on the vector representations associated with each of the plurality one or more devices.

* * * * *